United States Patent
Kalamaris

(10) Patent No.: US 8,832,995 B2
(45) Date of Patent: Sep. 16, 2014

(54) LAWN EDGING GRASS RESTRAINT

(76) Inventor: Stratios Kalamaris, Algonquin, IL (US)

( * ) Notice: Subject to any disclaimer, the term of this patent is extended or adjusted under 35 U.S.C. 154(b) by 0 days.

(21) Appl. No.: 13/610,002

(22) Filed: Sep. 11, 2012

(65) Prior Publication Data

US 2013/0239473 A1   Sep. 19, 2013

Related U.S. Application Data

(63) Continuation-in-part of application No. 12/968,934, filed on Dec. 15, 2010, now abandoned.

(60) Provisional application No. 61/295,894, filed on Jan. 18, 2010.

(51) Int. Cl.
  *A01G 1/08*  (2006.01)

(52) U.S. Cl.
  CPC ........................................ *A01G 1/08* (2013.01)
  USPC .............................................................. 47/33

(58) Field of Classification Search
  CPC .......................................................... A01G 1/08
  USPC ................................................... 47/33, 32.7
  See application file for complete search history.

(56) References Cited

U.S. PATENT DOCUMENTS

| | | | |
|---|---|---|---|
| 3,484,989 A | 12/1969 | Lazinsky |
| 3,788,001 A | 1/1974 | Balfanz |
| 4,644,685 A | 2/1987 | Tisbo et al. |
| 4,809,459 A | 3/1989 | Brylla et al. |
| 4,897,973 A | 2/1990 | Foster, Jr. et al. |
| 5,315,780 A | 5/1994 | Thomas |
| 5,638,635 A | 6/1997 | Palladino |
| 6,226,934 B1 | 5/2001 | Gaston |
| 6,385,898 B1 | 5/2002 | Noel |

*Primary Examiner* — Monica Williams
(74) *Attorney, Agent, or Firm* — C. John Brannon; Brannon Sowers & Cracraft PC

(57) ABSTRACT

A system for providing a barrier and redirecting the growth of grass away from concrete, walkways, patios and material typically found in a landscape. The system is comprised of a single sheet of extruded polyethylene having three members. The main member is inserted orthogonally to the surface of the ground, and has two members extruded away from it as some angle. The anchor member is part of the main member, and is inserted in the ground to provide support for the barrier. The surface member extends at some angle with respect to the main member into one edge of the landscape. The surface member extends into one edge of the material to provide a barrier between different types of landscape.

5 Claims, 3 Drawing Sheets

LAWN EDGING GRASS RESTRAINT

CONTINUATION IN PART TO RELATED APPLICATIONS

This application is a continuation in part of and claims priority to U.S. patent application Ser. No. 12/968,934, filed on Dec. 15, 2010 now abandoned, which claimed priority to U.S. Provisional Patent Application Ser. No. 61/295,894, filed on Jan. 18, 2010.

TECHNICAL FIELD

The novel technology disclosed herein relates generally to horticulture and, more specifically, to a barrier or restraint for placement between different types of terrain or landscaping to prevent the migration and unintentional mixing of different materials such as grasses, rock, wood, leaves, debris or any of the like where such mixing is undesirable and to aid the redirection of the growth of grass away from concrete, walkways and patios and eliminate the need for an edger.

BACKGROUND

The organization and separation of materials and elements in landscape addresses four primary goals. First, such organization and segregation decreases the time required for care-taking and lawn maintenance. Second, segregation provides a degree of control over invasive material such as unwanted grasses, weeds, plants, and/or other undesirable debris typically found in a landscape. Third, segregation of materials provides an aesthetically pleasing appearance to the terrain, giving landscapers a good feel for design as well as for ensuring the integrity of their design against natural forces. Fourth, ease of installment with limited obstruction during regular maintenance. An ideal barrier or restraint can perform all four of those functions equally well. Currently available products fail to adequately perform at least one, if not more, of these functions.

One known landscaping device includes an elongated strip with a body having two extensions therefrom. The first extension provides stability for the device in the ground, and the second extension protrudes at a right angle from the body to catch debris. The problem is that a device with a large L-shaped member does not provide a true barrier for invasive material. Further, as the exposed surface of the L-shaped member is large, the device can be easily seen from any angle, producing an unsightly appearance. Since the surface member is oriented 90 degrees with respect to the ground member, twigs, leaves and other debris will easily be trapped and thus must be manually removed from the barrier, increasing the time and expense necessary for care-taking. Accordingly, this barrier fails to accomplish any of the four primary goals particularly well.

Another known landscaping device type is somewhat more effective at segregating materials, but is quite unsightly and doesn't reduce care-taking costs. This device is essentially a cylinder or tube that may be connected to the ground. The tube has a pronounced appearance in the field of view. The purpose of this landscape divider is to prevent the mixing of materials, but it does so in a way that is visually jarring. Since aesthetic appeal of a landscape depends upon maintaining segregation of material in an inconspicuous way, a large unsightly tube protruding out of the ground and running across the landscape is counterproductive. While the tube may be effective in segregating materials, it in and of itself detracts from the aesthetic of the landscape. Additionally the protrusion of the tube from the surface of the landscape can create an artificial hazard during regular lawn maintenance. Lawnmower blades may damage portions of a raised barrier, ejecting any damaged pieces through the discharge chute. This potential hazard creates an unsafe environment and can require regular replacement of the damaged barriers. Thus, such a barrier is inherently problematic, due in part to its aesthetic intrusion potentially creating an unintentional hazard defeating the intended purpose of the barrier.

A landscape barrier should provide the most effective barrier to prevent mixing of the materials in the least obtrusive manner. For example, a concrete wall can be erected between a grassy terrain, and a bed of mulch. The wall prevents the mulch from mixing with the grass, and prevents the grass from growing into the mulch bed, but does so in an obtrusive and unsightly manner. The aesthetic appearance of a landscape is maximized when the barrier providing material division is unobtrusive.

What is needed is a barrier that decreases the time spent for care-taking, eliminates the need for a lawn edger, provides a significant degree of invasive material control and provides an aesthetically pleasing appearance to the terrain while limiting any potential hazard during the course of routine maintenance. The present invention addresses these needs.

DRAWING DESCRIPTION

DETAILED DESCRIPTION

Figure 1:
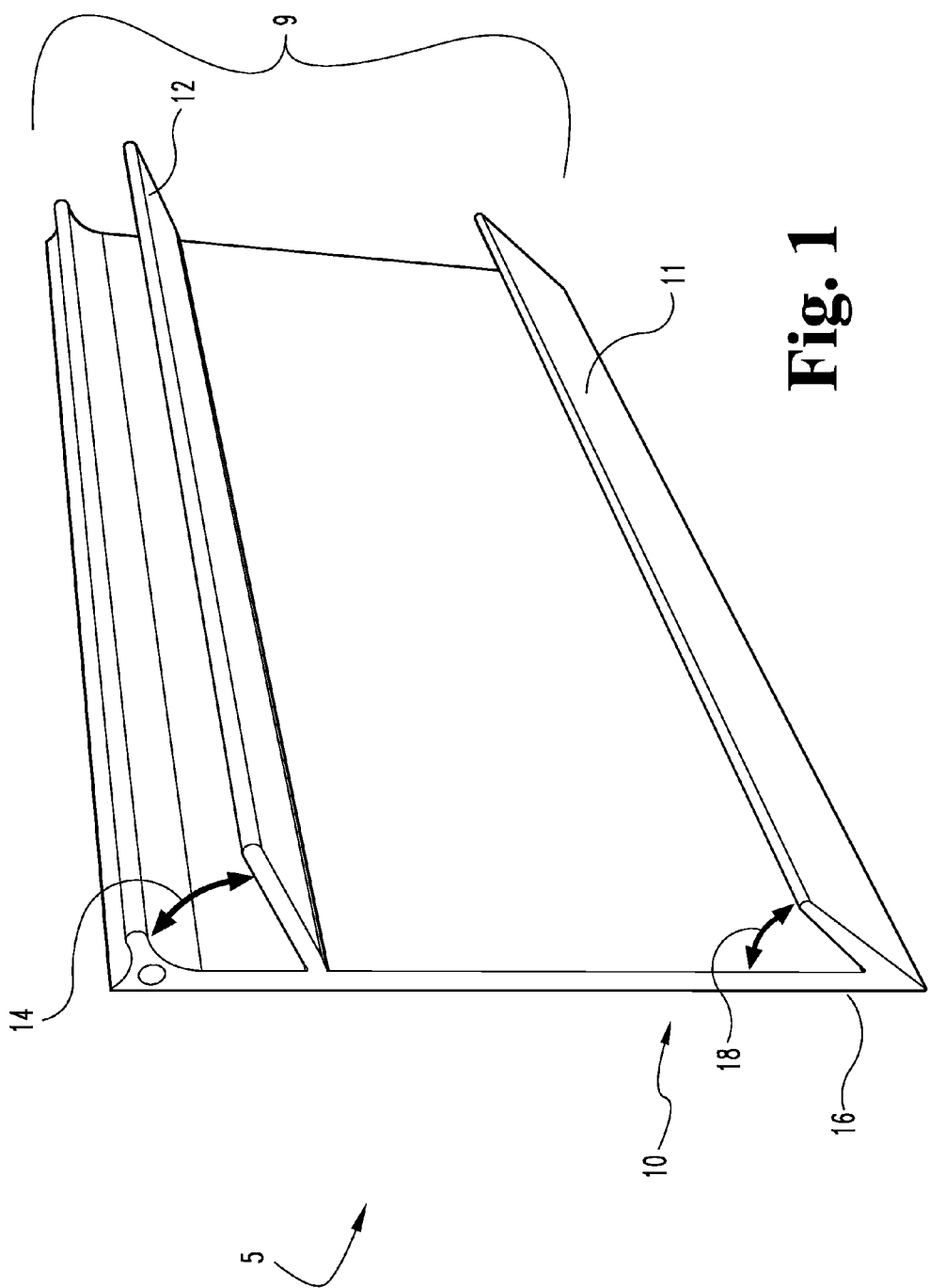
FIG. 1 is a longitudinal cross-sectional perspective view illustrating a first embodiment landscape barrier according to the present disclosure.
Figure 2:
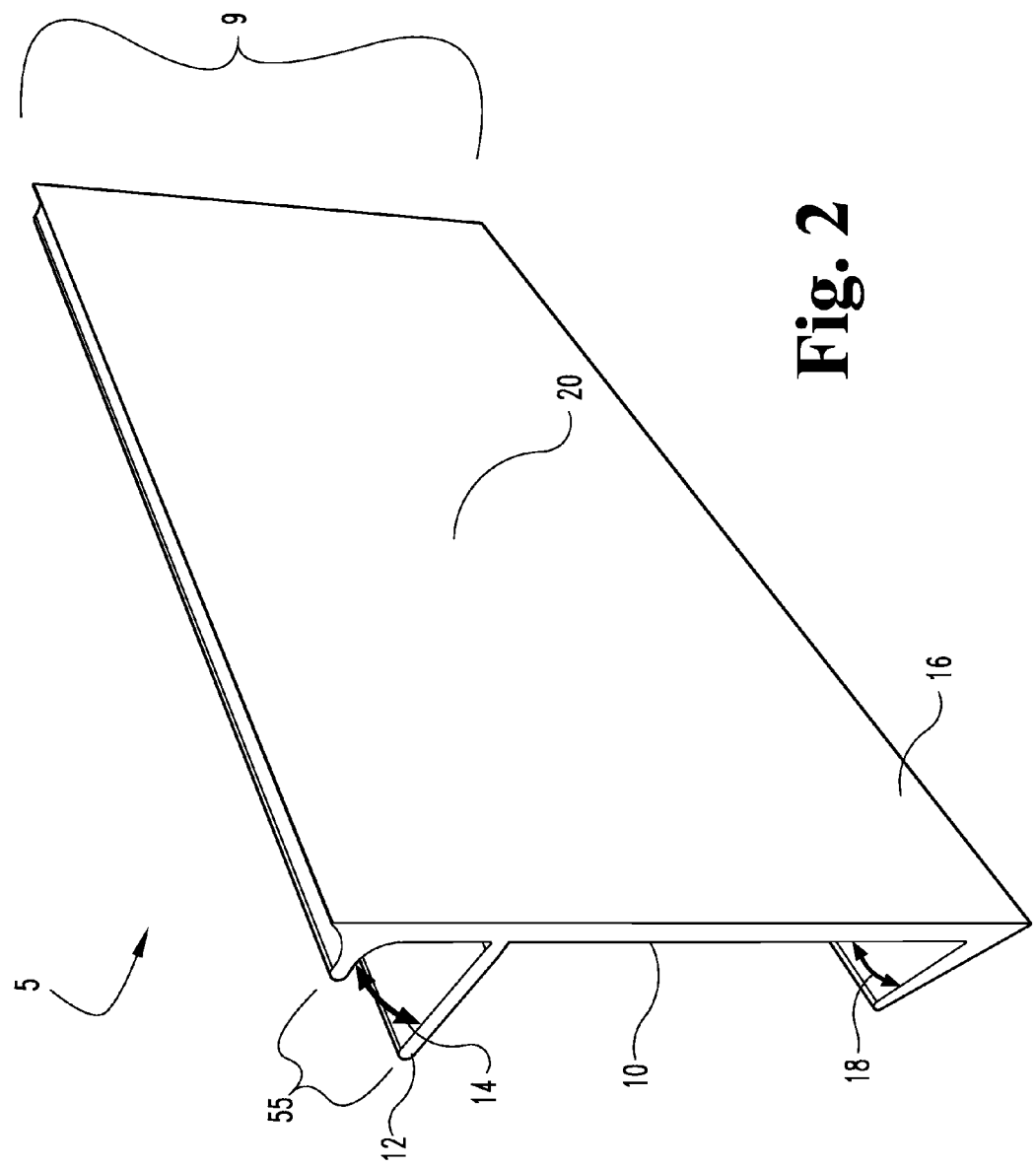
FIG. 2 is a longitudinal cross-sectional perspective view of the opposing side of the embodiment of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIGS. 1-4 illustrate a first embodiment system 5 for providing a barrier between different types of terrain. A typical embodiment of the system 5 will redirect the growth of grass away from concrete, walkways, patios and the like. The terrain could be made up of rocks, mulch, grass, flowers, shrubberies, or any other materials typically found or desired in a landscape. The barrier system 5 is typically made of plastic, and is more specifically but not limited to, made of polyethylene, polycarbonate, or the like. Alternately, the barrier system 5 may be made of any convenient material or combination of materials. Typically the barrier system 5 is formed as a unitarily extruded single sheet 9, but could also be molded, pressed or likewise formed from the appropriate materials. The barrier sheet 9 is typically configured to have three portions, an elongated main member 10, an elongated anchor member 11, and an elongated surface member 12.

The main member 10 may be thought of as having a proximal portion 15, a distal portion 16, and a medial portion 17 extending therebetween. The distal end or portion 16 of the main member 10 is configured to be inserted generally orthogonally into the subsurface of the ground. Typically, the main member 10 is about six inches wide. The anchor member 11 is typically about an inch in length and extends from the main member 10 at an angle 18 that is less than ninety but more than ten degrees, more typically about 30 degrees, and provides stability to the main member 10. The surface member 12 extends from the main member 10, typically near the proximal end 15, and is typically between about one and about two inches long. The surface member 12 intersects the main member 10 at an angle 14 that is less than ninety but more than ten degrees, more typically about sixty degrees, and provides a barrier to invasive materials while minimizing an unsightly appearance. The surface member 12 provides an angle that, typically, is most efficient at redirecting the growth of grass 52 away from a sidewalk, a concrete surface 51, or a patio.

Typically, members 11 and 12 extend from the same side of the main member 10, with the opposite side being a smooth surface 20 with no members extending therefrom. This smooth surface 20 will be applied to one edge of the materials to be divided. In alternate contemplated embodiments, members 11 and 12 extend from opposite sides of member 10. In other contemplated embodiments, identical members 11 and 12 extend from both sides of member 10.

Figure 3:
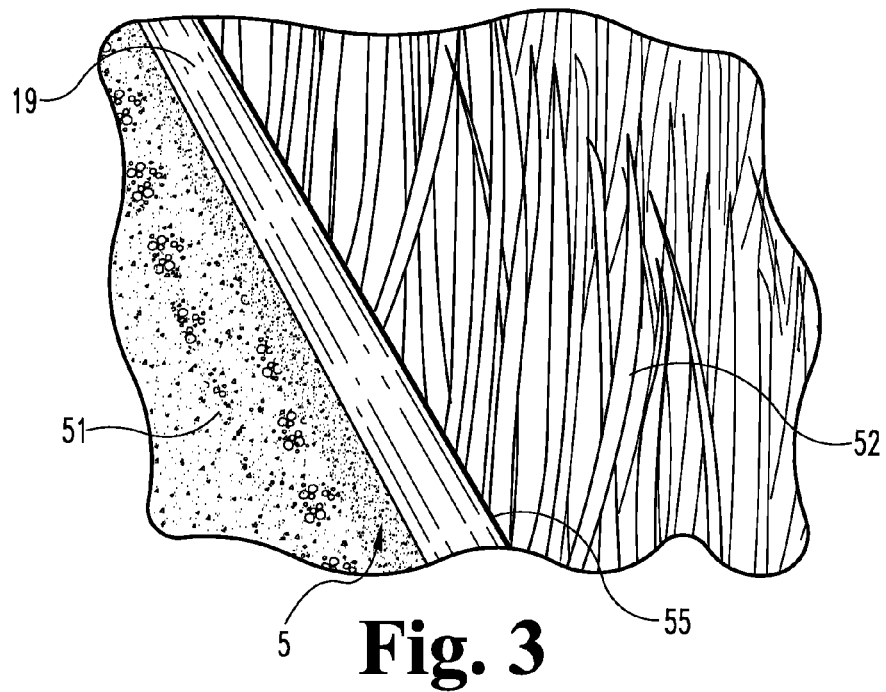
FIG. 3 is a top view of the landscape barrier of FIG. 1 positioned in the ground and separating two different materials.

The shape of the barrier 5 impacts the aesthetic appearance of the resulting landscape. As illustrated in FIG. 3, the proximal portion 15 is readily visible as separating the concrete 51 and grass 52 elements, typical of materials found in a landscape. The V-shape generated by the intersection of the surface member 12 and the main member 10 helps to provide a barrier for material division while maintaining an unobtrusive appearance. Emphasis is drawn to the landscape and the clean division of materials provided by the barrier 5.

Figure 4:
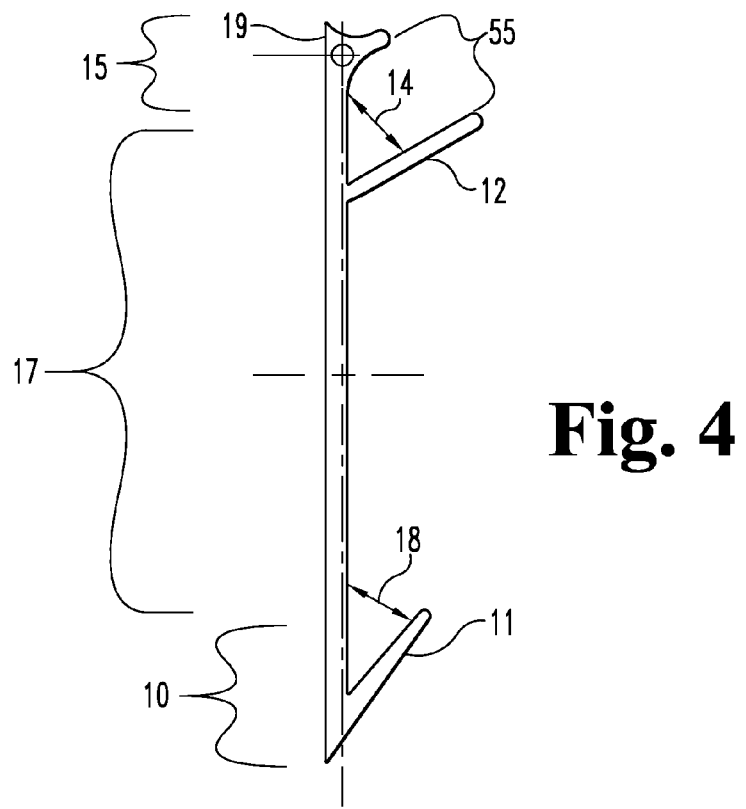
FIG. 4 is a side view of the embodiment of FIG. 1.

FIG. 4 illustrates in greater detail the angular relationship between the portions 10, 11, 12 of barrier 5. The barrier assembly 5 is made up of main member 10 (typically about six inches in length), an anchor member 11 (typically about one inch in length), surface member 12 (typically about one and a half inches in length). Proximal portion 15 may include a force receiving or mallet-engaging portion 19, which is a widened or wedge-shaped member 19 terminating the proximal portion 15. The geometry generated by the intersection of the surface member 12 and the main member 10 defines a V-shape that minimizes the exposed surface area of the barrier system 5. Likewise, anchor member 11 extends from the distal end 16, and the intersection of anchor member 11 and main member 10 defines a J-shaped hook or anchor for ground engagement.

Material retention is one of the functions of barrier 5. A typical barrier system 5 includes a surface member 12 extending from the main member 10 to create an edge 55 at an angle 14 with respect to the main member 10. This angled edge 55 promotes material retention. At an angle 14 of about sixty degrees, the V-shape of the surface member/main member intersection 55 promotes material retention by urging material away from the barrier 5. Retention is also enhanced by the offset position of the "V" 55, which yields an applied force pushing materials away from the barrier assembly 5.

Providing a superior barrier 5 generally lowers maintenance costs. As illustrated in FIG. 3, the barrier 5 has a surface member 12 that protrudes into one edge of the landscape, urging plants grasses, and/or other material back towards their respective terrains. This V-shaped geometry 55 also reduces exposure of sunlight to the soil below the barrier 5 inhibiting unwanted growth of invasive plants or grasses. Thus routine maintenance, such as trimming, edging, manual separation of materials and the like is not required, thus maximizing cost-effectiveness of this barrier system 5.

In operation, one or more barrier sheets 9 are positioned, typically consecutively, along a desired border or predetermined landscape path. A force is applied to the mallet-engaging portion 19 to urge the anchor portion 11 into the ground, typically until the surface portion 12 abuts the ground and provides resistance to further insertion. The V-shaped edge 55 urges debris and materials away from the barrier assembly 5.

The V-shaped edge 55 formed by the surface portion 12 and the mallet-engaging portion 19 acts as a double barrier when engaging landscape materials. The surface portion 12 is angled into the material so as to engage and direct grasses, shrubberies, and the like away from the mallet-engaging portion 19, which is itself providing a second barrier to prevent the mixing of materials.

The unique construction of the barrier 5 creates a low profile once inserted into the ground, creating a minimal obstruction during routine maintenance. This low profile barrier 5, once inserted far enough into the ground such that only the V-shaped edge 55 extends above ground, retains the benefits of redirecting vegetation 52 while limiting potential damage to itself 5 and the surrounding landscape during lawn maintenance. The exposure height of the mallet-engaging portion 19 reduces need for frequent replacement that may arise from unnecessary damage to the barrier 5 while still providing an improved flexible impediment to uncontrolled spreading of the landscaping.

In addition to the low profile of the barrier 5, a solid, concave impact receiving portion 19 creates a superior receiving location for the force needed to drive the barrier 5 into the subsurface of the ground, as opposed to a convex rounded surface which may be damaged by concentrating impact force at the receiving point. The claimed barrier 5 offers an impact receiving portion 19 which creates an improved strike area for the installer while limiting the potential risk of damage. Secondarily the impact receiving portion 19 also aids in the directional control of the separated landscape grass 52. This is accomplished by the impact receiving portion 19 having a flat top profile with an extended lip 55 that limits the angle 14 of closure experienced by the elongated surface member 12. This active engagement of landscape 52 directionally forces growth away from the barrier 5 preventing overgrowth. Prior art in this field has been limited to a static barrier with either a rounded or flat upper portion, which only teach a passive separation of landscape terrain, thus allowing for the overgrowth of plant matter. In other words, rounded top portions allow for plants to grow up and over, while the acutely angled 14 wedge 55 urges plants to grow back away from the barrier 5.

This barrier 5 also reduces the amount of force needed to drive the main member 17 into the desired location because of the novel V-shaped angled anchor portion 11. The barrier's 5 V-shaped anchor portion 11, at the distal end 10, actively flexes to create minimal resistance during insertion. This single V-shaped anchor portion 11 on one side further minimizes the lawn 52 damage upon insertion. Once the barrier 5 has been properly positioned any upward pull will urge the V-shaped anchor portion 11 away from the medial body portion 17, thus forming a wedge and inhibiting removal. A single flexible anchor member 11 provides a surer hold with less force required to implant the barrier 5 than would a plurality of engaging ridges extending from one or both sides, and with less attendant lawn damage.

While the disclosure has been illustrated and described in detail in the figures and foregoing description, the same is to be considered as illustrative and not restrictive in character, it being understood that only selected embodiments have been shown and described and that all changes, modifications and equivalents that come within the spirit of the disclosures described heretofore and/or defined by the following claims are desired to be protected. In addition, all publications cited herein are indicative of the level of skill in the art and are hereby incorporated by reference in their entirety as if each had been individually incorporated by reference and fully set forth.

What is claimed is:

1. A method of providing a low profile unobtrusive division of different landscape terrain, comprising:
    a sheet of flexible material for providing a barrier in a landscape and having a distal portion, a proximal portion and a medial portion extending between the distal portion and the proximal portion;
    a first elongated member extending from the medial portion engaging a landscape medium below a landscape surface;
    a second elongated member extending from the distal portion engaging the landscape subsurface to prevent retraction of the barrier;
    wherein the distal portion is angularly inserted into the ground to a predetermined depth to leave the proximal portion extending such that the proximal portion is above ground and the medial portion is underground;
    wherein the first elongated member extending from the medial portion is positioned to actively engage below the landscape surface, wherein the first elongated member urges differential terrain away from the barrier.

2. The method of claim 1, wherein the proximal portion incorporates a wedge for receiving force to urge the second elongated member into the subsurface of the landscape.

3. The method of claim 1, wherein the first elongated member of the medial portion possesses a predetermined angle of about 60 degrees, wherein adjustment in the depth of insertion creates additional tension on the interacting landscape medium.

4. A method of providing a minimally obstructive barrier to limit encroachment by vegetation, comprising:
    a single member sheet of flexible material having a proximal end, a distal end and a medial member;
    a distal anchor upwardly angled originating from the distal end, a subsurface engaging member for engaging vegetation below the landscape surface near the proximal end, and a mallet engaging member extending from the proximal end;
    wherein the sheet of flexible material is inserted in an orthogonal direction into the desired landscape to a depth that visibly limits the observable proximal portion;
    wherein the subsurface engaging member actively limits directional encroachment of vegetation by applying a desired directional force to redirect vegetation away from the barrier.

5. The method of claim 4, wherein the flexible barrier is inserted into the landscape at a depth below the desired vegetation limiting obstruction and complications from routine lawn maintenance.

* * * * *